(12) United States Patent
Mashiki

(10) Patent No.: US 9,556,817 B2
(45) Date of Patent: Jan. 31, 2017

(54) FUEL INJECTION DEVICE FOR INTERNAL COMBUSTION ENGINE

(71) Applicant: Zenichiro Mashiki, Nisshin (JP)

(72) Inventor: Zenichiro Mashiki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 180 days.

(21) Appl. No.: 14/420,760

(22) PCT Filed: Mar. 22, 2013

(86) PCT No.: PCT/JP2013/058350
§ 371 (c)(1),
(2) Date: Feb. 10, 2015

(87) PCT Pub. No.: WO2014/024515
PCT Pub. Date: Feb. 13, 2014

(65) Prior Publication Data
US 2015/0204266 A1    Jul. 23, 2015

(30) Foreign Application Priority Data

Aug. 10, 2012 (JP) ................................. 2012-178658

(51) Int. Cl.
*B60T 7/12* (2006.01)
*F02D 41/30* (2006.01)
(Continued)

(52) U.S. Cl.
CPC .......... *F02D 41/3094* (2013.01); *B60W 20/00* (2013.01); *B60W 20/10* (2013.01);
(Continued)

(58) Field of Classification Search
CPC .............. F02B 2075/125; F02B 23/101; F02D 2041/389; F02D 2001/0085
(Continued)

(56) References Cited

U.S. PATENT DOCUMENTS

2003/0121495 A1* 7/2003 Abo ...................... F02B 17/005
123/295
2006/0016429 A1* 1/2006 Mashiki ................ F02D 41/047
123/431
(Continued)

FOREIGN PATENT DOCUMENTS

DE   10 2010 037 147 A1   4/2011
JP      2005-120852 A      5/2005
JP      2011-047314 A      3/2011

OTHER PUBLICATIONS

International Search Report issued Jun. 18, 2013 in PCT/JP2013/058350 Filed Mar. 22, 2013.

*Primary Examiner* — John Kwon
(74) *Attorney, Agent, or Firm* — Oblon, McClelland, Maier & Neustadt, L.L.P.

(57) ABSTRACT

A cylinder injection valve that injects fuel inside a cylinder and an intake passage injection valve that injects fuel inside an intake passage are provided. When it is determined that deposit greater than or equal to a predetermined amount accumulates, the fuel is forcibly injected by the cylinder injection valve (deposit removing control). The deposit removing control is performed when a pressure of the fuel supplied to the cylinder injection valve is greater than or equal to a predetermined value and an engine load is relatively high. On the other hand, the deposit removing control is not performed when the pressure of the fuel supplied to the cylinder injection valve is greater than or equal to the predetermined value and the engine load is low.

8 Claims, 11 Drawing Sheets

(51) Int. Cl.
*B60W 20/00* (2016.01)
*F02M 69/04* (2006.01)
*F02D 41/22* (2006.01)
*B60K 6/445* (2007.10)

(52) U.S. Cl.
CPC ......... *B60W 20/16* (2016.01); *F02D 41/3005* (2013.01); *B60K 6/445* (2013.01); *B60W 2510/0623* (2013.01); *F02D 41/221* (2013.01); *F02D 2041/224* (2013.01); *F02D 2200/0602* (2013.01); *F02M 69/046* (2013.01); *F02M 2200/06* (2013.01); *Y02T 10/6239* (2013.01)

(58) Field of Classification Search
USPC .......... 701/103–105; 123/295, 431, 445, 434
See application file for complete search history.

(56) References Cited

U.S. PATENT DOCUMENTS

| | | | |
|---|---|---|---|
| 2006/0213482 A1* | 9/2006 | Shibagaki | F02D 41/221 123/396 |
| 2006/0272618 A1* | 12/2006 | Iwahashi | F02D 41/08 123/458 |
| 2011/0048393 A1 | 3/2011 | Akita et al. | |
| 2012/0152205 A1* | 6/2012 | Matsumura | F02M 61/184 123/445 |
| 2013/0233275 A1* | 9/2013 | Berkemeier | F02M 53/04 123/295 |

* cited by examiner

FUEL INJECTION DEVICE FOR INTERNAL COMBUSTION ENGINE

TECHNICAL FIELD

The present invention relates to fuel injection control in an internal combustion engine including a dual injection system made up of a cylinder injection valve that injects fuel inside the cylinder and an intake passage injection valve that injects fuel inside the intake passage. Particularly, the present invention relates to control to remove deposit that accumulates on the cylinder injection valve.

BACKGROUND ART

Conventionally, as a gasoline internal combustion engine (hereinafter also referred to as "engine") that is mounted, for example, on a vehicle, a so-called dual injection type engine is known, which has a dual injection system that includes a cylinder injection valve and an intake passage injection valve. Such a dual injection type engine has a problem that deposit is formed and accumulates on the cylinder injection valve, at an injection hole that faces a combustion chamber in a cylinder so as to be exposed to combustion gas having a high temperature.

To address the above problem, in a fuel injection device described in Patent Document 1, when only a port-injection injector (intake passage injection valve) is used due to, for example, duration of a low load operation such as an idling for a predetermined time period or longer, it is determined that the deposit greater than or equal to a predetermined amount accumulates on a cylinder-injection injector (cylinder injection valve). Then, even if the operation state is supposed to use the port-injection injector, the fuel is injected forcibly by the cylinder-injection injector so as to remove the deposit that accumulates on the injection hole (deposit removing control).

PRIOR ART DOCUMENT

Patent Document

[Patent Document 1] JP 2005-120852 A

SUMMARY OF INVENTION

Problem to be Solved by Invention

However, as described above, if the low load engine operation continues, there are some cases where the fuel in a delivery pipe that is connected to the cylinder-injection injector is further pressurized by receiving heat from a cylinder head and the like. In such a case, even if the cylinder-injection injector is operated for its minimum valve opening time period (minimum injection time period) at the time of the above-described deposit removing control, the amount of the injected fuel exceeds a target injection amount, which may cause deterioration of combustion and emission due to enrichment of an air-fuel ratio.

When the fuel pressure in the delivery pipe is higher than or equal to a predetermined value and the above-described enrichment of the air-fuel ratio is expected, it may be possible to prohibit the deposit removing control. However, with such a means, there is a concern that opportunity to perform the deposit removing control is reduced and effect of the control is not sufficiently obtained, although the above-described deterioration of the combustion state and the emission can be avoided.

In consideration of the above-described problems, an object of the present invention is to increase the opportunity to perform the deposit removing control to the extent possible while preventing the deterioration of the combustion state and the emission of the internal combustion engine caused by the control.

Means for Solving Problem

In order to obtain the above object, the present invention is applied to a fuel injection device of an internal combustion engine that includes: a cylinder injection valve configured to inject fuel inside a cylinder of the internal combustion engine; an intake passage injection valve configured to inject fuel inside an intake passage; and a control device configured to perform deposit removing control to inject the fuel by the cylinder injection valve so as to remove deposit on the cylinder injection valve when the deposit greater than or equal to a predetermined amount accumulates.

In the configuration of the present invention, when a pressure of the fuel supplied to the cylinder injection valve is greater than or equal to a predetermined value, the control device permits execution of the deposit removing control in a region where an engine load is high, and does not permit the execution of the deposit removing control in a region where the engine load is low.

That is, when the pressure of the fuel (fuel pressure) supplied to the cylinder injection valve is greater than or equal to the predetermined value, and therefore an amount of the injected fuel exceeds the standard minimum injection amount of the cylinder injection valve even if the cylinder injection valve is operated for its minimum valve opening time period, the air-fuel ratio is not enriched according to the execution of the deposit removing control under the condition that the load of the internal combustion engine is relatively high and the target injection amount is greater than or equal to the amount of the injected fuel.

Thus, in consideration of not only the fuel pressure but also the engine load, the execution of the deposit removing control is permitted in the region where the engine load is high and is not permitted in the region where the engine load is low. In this way, it is possible to increase the opportunity to perform the deposit removing control to the extent possible while preventing the enrichment of the air-fuel ratio due to the fuel injection by the cylinder injection valve. Thus, the deterioration of the combustion state and the emission can be prevented.

Preferably, the control device may have a configuration that permits the execution of the deposit removing control when an engine load rate is greater than or equal to a predetermined threshold value, and does not permit the deposit removing control when the engine load rate is less than the threshold value. In this case, the threshold value is preferably set to be higher as the fuel pressure is higher.

In this way, when the fuel pressure is not so high and the minimum injection amount of the cylinder injection valve is relatively small (i.e., close to the standard minimum injection amount), the threshold value of the engine load rate becomes low and thus the opportunity to perform the deposit removing control increases. On the other hand, as the minimum injection amount more increases according to the increase of the fuel pressure (i.e., as deviation from the standard minimum injection amount becomes larger), the threshold value of the engine load rate becomes higher.

Thus, even when the fuel pressure is high, the enrichment of the air-fuel ratio can be suppressed.

As a result, it is possible to realize, in the higher dimension, the two objects that contradict to each other: to increase the opportunity to perform the deposit removing control to the extent possible; and to prevent the deterioration of the combustion and the emission caused by the control.

Also, when the fuel pressure is considerably low, there is no possibility that the fuel injection amount exceeds the target injection amount even in the low load state such as an idling. Thus, there is no concern about the enrichment of the air-fuel ratio due to the execution of the deposit removing control. Taking into account this fact, when the fuel pressure is less than the predetermined value, the control device may permit the execution of the deposit removing control regardless of whether the engine load is high or low.

Here, it is possible to determine whether the deposit removing control should be performed in consideration of not only the engine load rate but also, for example, an engine rotational speed. For example, in a case where the internal combustion engine is mounted on a vehicle, when the combustion is deteriorated due to the enrichment of the air-fuel ratio, an engine torque fluctuation may occur to cause an uncomfortable feeling to an occupant of the vehicle. However, such an engine torque fluctuation is more hardly noted by a person, in general, as the engine rotational speed is higher.

Thus, the control device may compare an engine power output, which is obtained by multiplication of the engine load rate by the engine rotational speed, to a predetermined threshold value so as to permit the execution of the deposit removing control when the engine power output is greater than or equal to the predetermined threshold value, and not permit the execution of the deposit removing control when the engine power output is less than the threshold value. In this case also, the threshold value is preferably set to be higher as the fuel pressure is higher.

Also, in the case where the internal combustion engine is mounted on the vehicle, if a high-power generator driven by the internal combustion engine is provided as in the case of a hybrid vehicle, the control device may perform the deposit removing control when the generator operates to generate electric power. In this way, if a small torque fluctuation occurs due to the execution of the deposit removing control, such a torque fluctuation blends into a torque change accompanied by the operation of the generator. Thus, it hardly causes an uncomfortable feeling to an occupant of the vehicle.

Also, if the generator is provided as described above, the control device may forcibly operate the generator to generate electric power in order to perform the deposit removing control, and to increase the engine load. Thus, the opportunity to perform the control can be further increased while preventing the deterioration of the combustion and the emission due to the deposit removing control.

It is possible to determine whether the deposit greater than or equal to the predetermined amount accumulates on the cylinder injection valve based on a long time duration of the fuel injection by the intake passage injection valve, similarly to the conventional cases. For example, the control device may determine that the deposit greater than or equal to the predetermined amount accumulates on the cylinder injection valve when, within a predetermined time period up to a present time, an accumulated time period for the fuel injection by the intake passage injection valve is greater than or equal to a first predetermined value, and furthermore, an accumulated time period for the fuel injection by the cylinder injection valve is less than or equal to a second predetermined value that is less than the first predetermined value.

In the above-described case, it is preferable to consider not only the time period but also the engine operation state. For example, taking into account the fact that the deposit is more easily formed as the temperature of the combustion chamber is higher, the control device may determine that the deposit greater than or equal to the predetermined amount accumulates in further consideration of an operation history of the internal combustion engine within the predetermined time period.

Effects of Invention

As described above, in the fuel injection device according to the present invention in a dual injection type internal combustion engine including a cylinder injection valve and an intake passage injection valve, it is permitted to perform the deposit removing control conditional on the engine load being relatively high even if the pressure of the fuel supplied to the cylinder injection valve is equal to or higher than the predetermined value. Thus, it is possible to sufficiently ensure the opportunity to perform the control. On the other hand, when the engine load is low, the deposit removing control is prohibited so as to prevent the deterioration of the combustion state and the emission of the internal combustion engine.

MODES FOR CARRYING OUT INVENTION

Hereinafter, an embodiment of the present invention will be described with reference to the drawings. In this embodiment, as an example, a case where the present invention is applied to an engine of a hybrid vehicle is described. In this embodiment, the hybrid vehicle is a front-engine front-drive (FF) type vehicle in which an engine 1 (internal combustion engine) mounted on a front part of the vehicle body drives front wheels 2 that serve as the drive wheels. However, the hybrid vehicle is not limited thereto.

—Summary of Hybrid System—

Figure 1:
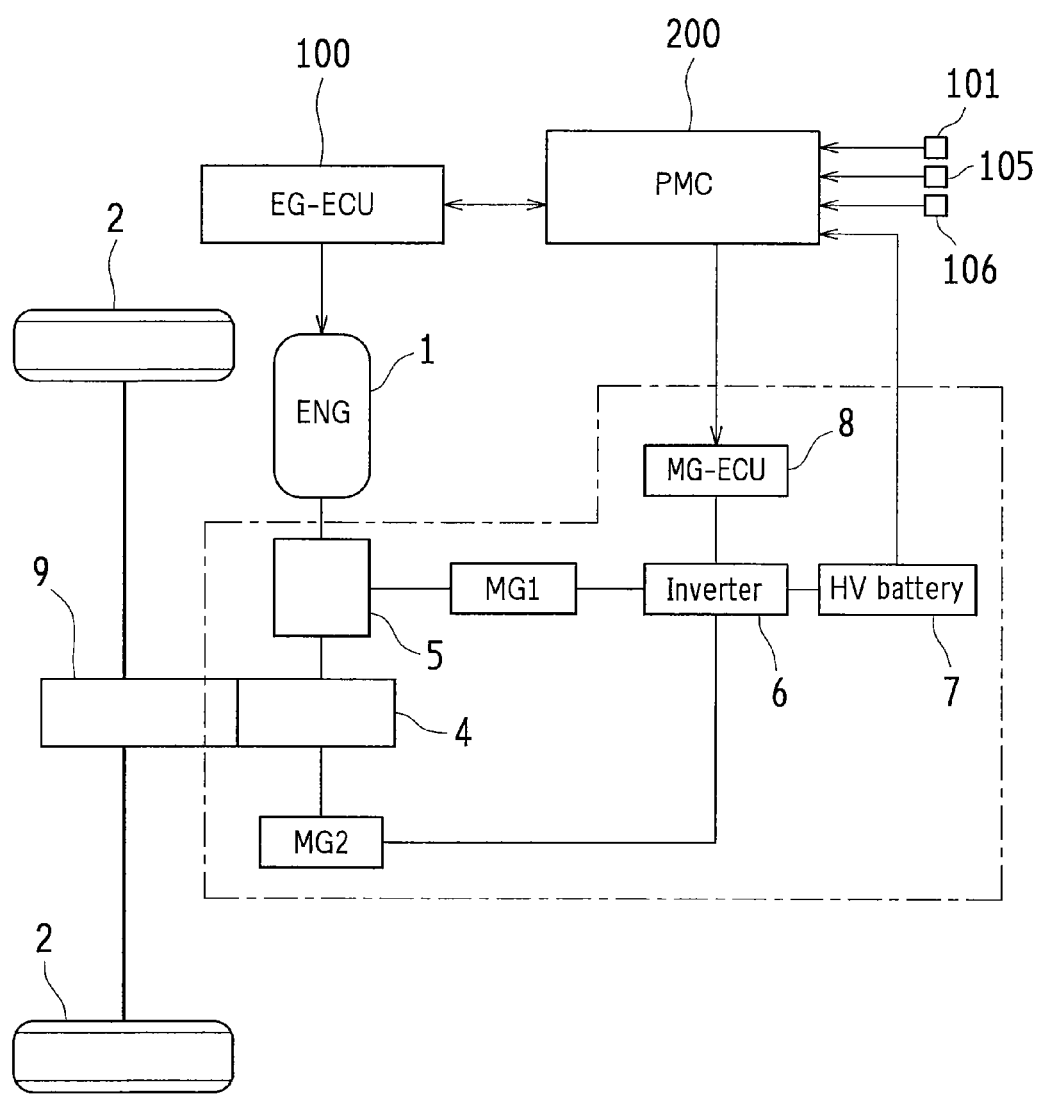
FIG. 1 is a schematic configuration diagram of a hybrid system of a vehicle on which an engine according to an embodiment of the present invention is mounted.

A brief description will be given with respect to the summary of the hybrid system of the vehicle according to this embodiment. As shown in FIG. 1, in the vehicle are mounted an engine 1, a motor generator MG 1, a motor generator MG 2, a reduction mechanism 4, a power splitter 5, an inverter 6, an HV battery 7 and the like, each of which is a known configuration. The vehicle drives the front wheels 2 using output from the engine 1 along with from, mainly, the motor generator MG 2.

The engine 1 will be described for details later. Its operation is controlled by an engine control unit 100 (hereinafter referred to as "EG-ECU 100"). The EG-ECU 100 controls an intake air amount (hereinafter also referred to as "intake amount"), a fuel injection amount, an ignition timing and the like according to a requirement of a driving force to the engine 1 (e.g., a target engine output), an engine rotational speed and the like, thus the operation of the engine 1 is controlled.

The motor generators MG 1 and MG 2 are each, for example, constituted by an alternating-current synchronous motor, which functions as a motor or a generator. That is, the motor generators MG 1 and MG 2 are each connected via the inverter 6 to the HV battery 7. By controlling the inverter 6 using a motor generator control unit 8 (hereinafter referred to as "MG-ECU 8"), each motor generator MG1 and MG2 is switched between a motor operation state and a generator operation state.

For example, the motor generator MG 1 connected to the power splitter 5 is driven by the output from the engine 1 so as to operate as the generator. Electric power generated in this way is supplied to the HV battery 7 via the inverter 6 so as to be charged, and if necessary, the electric power is also supplied to the motor generator MG 2. Furthermore, the motor generator MG 1 functions as a starter motor that carries out cranking when the engine 1 is started.

On the other hand, the motor generator MG 2 connected to the reduction mechanism 4 can operate as the motor by receiving the electric power from the HV battery 7. Furthermore, the motor generator MG 2 operates as the generator when the vehicle is braked and regenerates electric power from kinetic energy. The regenerative electric power is supplied to the HV battery 7 via the inverter 6 so as to be charged.

The reduction mechanism 4 is configured, for example, by a known planetary gear mechanism to transmit power generated by the engine 1 and the motor generators MG 1 and MG 2 to the front wheels 2 via a differential 9 and an axle. The reduction mechanism 4 can also transmit a rotational force of the front wheels 2 to the engine 1 and the motor generators MG 1 and MG 2.

The power splitter 5 is configured, for example, by a known planetary gear mechanism to split power from the engine 1 to the motor generator MG 2 and the motor generator MG 1. As one example, out of rotational elements of the power splitter 5, a ring gear is coupled to the rotary shaft of the motor generator MG 2, a sun gear is coupled to the rotary shaft of the motor generator MG 1 and a carrier is coupled to the output shaft of the engine 1. The power splitter 5 also functions as a continuously variable transmission by controlling the rotational speed of the motor generator MG 2.

The inverter 6 includes, for example, a semiconductor switching element such as an IGBT (insulated gate bipolar transistor). The inverter 6 converts the direct current of the HV battery 7 into the three phase alternating current to supply it to the motor generators MG 1 and MG 2, and controls electric power to be supplied as well as its frequency. The inverter 6 can charge the HV battery 7 by converting the three phase alternating current generated by the motor generators MG 1 and MG 2 into the direct current. Furthermore, the inverter 6 supplies, as necessary, the alternating current that is generated by the motor generator MG 1 and that serves as electric power for drive to the motor generator MG 2.

The overall control of the above-described system is performed by a power management controller 200 (hereinafter referred to as "PMC 200"). For example, the PMC 200 calculates torque necessary for driving the vehicle, the target engine output, a target motor torque and the like based on, for example, an accelerator opening degree corresponding to a stepping amount of an accelerator pedal (not shown). Then the PMC 200 outputs such calculated results, as control instructions, to the EG-ECU 100 and the MG-ECU 8.

The EG-ECU 100 and the MG-ECU 8 that received the above control instructions respectively perform control to operate the engine 1 and control, by the inverter 6, to operate the motor generators MG 1 and MG 2. Thus, the driving force, the rotational speed and the like of the front wheels 2 are controlled using either the engine 1 or the motor generator MG 2, or both of them, as a power source.

Specifically, when the vehicle is started or travels at a low speed, i.e., when the engine efficiency is in a low region, the engine 1 is stopped and the front wheels 2 can be driven by power from the motor generator MG 2 only. When the vehicle is normally traveled, the front wheels 2 are often driven by power generated by operation of the engine 1. Also, when the engine 1 is under a high load, for example, at the time of full throttle acceleration, the motor generator MG 2 is also operated in order to add auxiliary power to the power of the engine 1.

The engine 1 is occasionally stopped even when the vehicle is traveling according to the vehicle operation state, the state of charge (SOC) of the HV battery 7 and the like. After that, the engine 1 is re-started as necessary based on monitoring of the vehicle operation state, the state of charge (SOC) of the HV battery 7 and the like. For this reason, in the hybrid vehicle, even when an ignition switch is on, the engine 1 is occasionally stopped and re-started repeatedly, i.e., performs an intermittent operation.

—Configuration of Engine—

Figure 2:
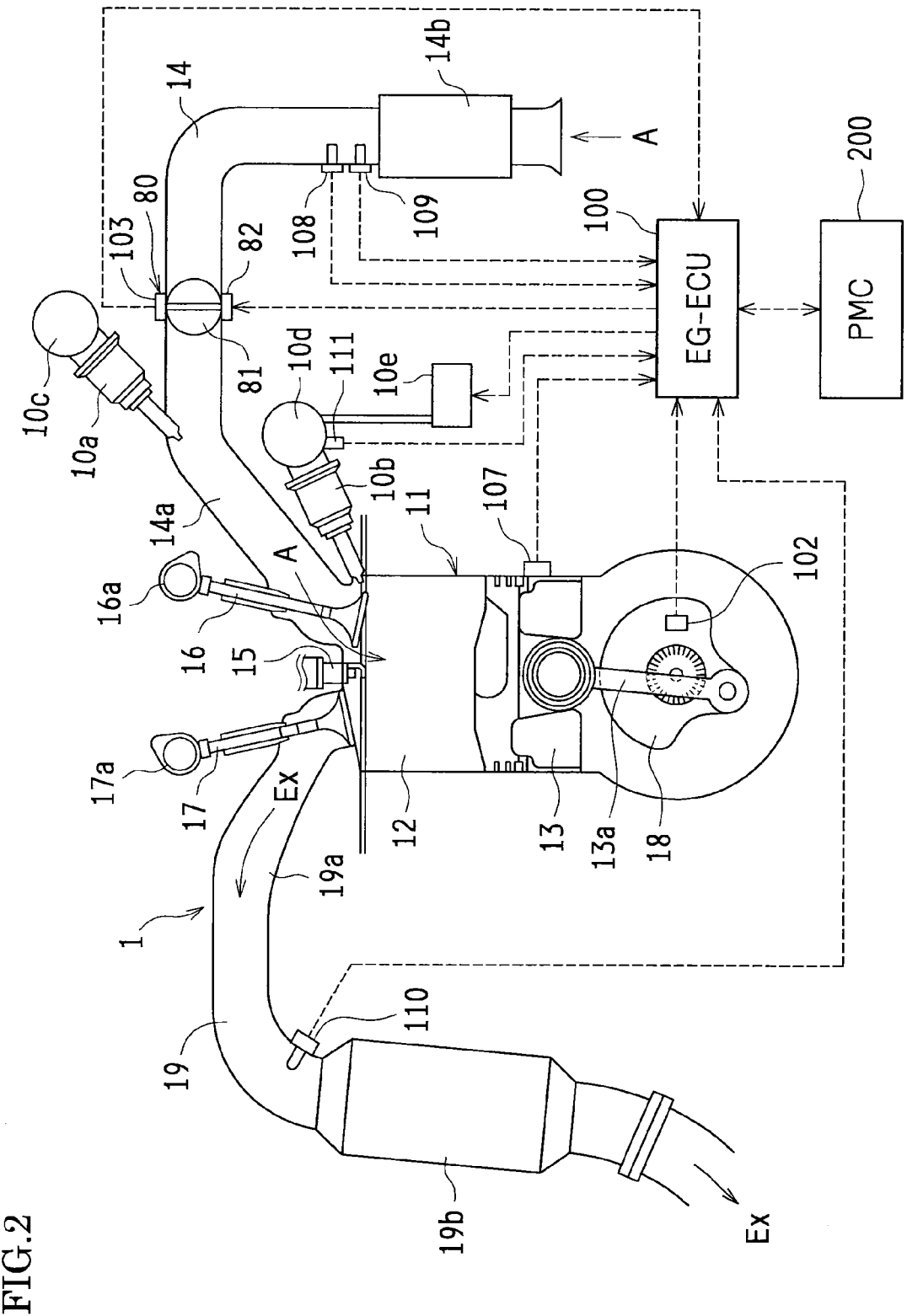
FIG. 2 is a schematic configuration diagram of the above engine.

Next, the general configuration of the engine 1 will be described with reference to FIG. 2. In this embodiment, the engine 1 is a spark ignition reciprocating engine, for example, an inline-four engine. In FIG. 2, only a single cylinder 11 is shown. As shown in the figure, a piston 13 is inserted into the cylinder 11 of the engine 1 so as to move up and down. On the upper side in the cylinder 11, a combustion chamber 12, whose volume changes according to the reciprocating movement of the piston 13, is sectioned.

In a ceiling portion of the combustion chamber 12, an intake passage 14 and an exhaust passage 19 are opened. A port-injection type injector (port-injection injector; intake passage injection valve) 10a is provided in such a manner that its injection hole faces a part of the intake passage 14; i.e., an intake port 14a. Also, a cylinder-injection type injector (direct-injection injector; cylinder injection valve) 10b is provided in such a manner that its injection hole faces the combustion chamber 12.

The delivery pipes 10c and 10d that are common to the four cylinders 11 are respectively connected to the injectors 10a and 10b, so that the fuel pressurized and accumulated in the delivery pipes 10c and 10d is supplied. The delivery pipe 10c connected to the port-injection injector 10a is connected to a low-pressure fuel supply system for supplying fuel drawn from a fuel tank by a motor pump, although it is not shown in the figure. Thus the fuel having a relatively low pressure is supplied to the port-injection injector 10a.

On the other hand, to the delivery pipe 10d connected to the direct-injection injector 10b, a high-pressure fuel pump 10e that is mechanically driven by, for example, an intake camshaft 16a is connected. Fuel taken out from the low-pressure fuel supply system via a branch passage is pressurized by the high-pressure fuel pump 10e so as to be supplied to the delivery pipe 10d, although it is not shown in the figure. The delivery pipe 10d supplies the fuel having a relatively high pressure to the direct-injection injector 10b.

The fuel injected by at least either injector 10a or 10b is mixed with an intake air A that passes through the intake passage 14 to be introduced into the combustion chamber 12, thus a combustible air-fuel mixture is formed inside the combustion chamber 12. That is, in an intake stroke of each cylinder 11, the piston 13 moves down as shown in the figure and an intake valve 16 is opened, thus the intake air A is introduced from the intake port 14a to the combustion chamber 12.

After that, in a final phase of a compression stroke, the air-fuel mixture compressed by a rise of the piston 13 is ignited by a spark plug 15, then the combustible gas of the air-fuel mixture depresses the piston 13 and rotates the crankshaft 18 via the connecting rod 13a. In this way, the pistons 13 of the respective cylinders 11 move up and down with predetermined phase differences, and a rotational force of the crankshaft 18 is taken out as the output of the engine 1.

The rotation of the crankshaft 18 is transmitted to the intake camshaft 16a via a timing chain and the like (not shown). The intake valve 16 driven by the cam is opened, as described above, in the intake stroke of the cylinder 11. Thus, a valve system that opens and closes the intake valve 16 is, as one example, a DOHC type, which also has an exhaust camshaft 17a for opening and closing an exhaust valve 17.

In an exhaust stroke of each cylinder 11, the exhaust valve 17 that is driven by the exhaust camshaft 17a is opened along with the elevation of the piston 13 so as to discharge combusted gas from the combustion chamber 12 to a part of the exhaust passage 19, i.e., an exhaust port 19a. Such a discharged combusted gas, i.e., an exhaust gas Ex is purified by a catalytic converter 19b located on the downstream side of the exhaust passage 19 so as to be released in the air.

In order to control the output of the engine 1 that operates as described above, a throttle body 80 is provided on the downstream side of an air cleaner 14b on the intake passage 14. The throttle body 80 includes a throttle valve 81 that restricts a flow of the intake air so as to control an amount of the flow (intake air amount), a throttle motor 82 that opens and closes the throttle valve 81 and a throttle opening degree sensor 103 that detects an opening degree of the throttle valve 81.

To the engine 1 are attached sensors that obtain information to control the operation of the engine 1. Such sensors include, for example: an accelerator opening degree sensor 101 (not shown) that outputs a detection signal according to the stepping amount of the accelerator pedal; a crank position sensor 102 used for detection of the engine rotational speed; a water temperature sensor 107 that detects a coolant temperature in a water jacket; an airflow meter 108 that detects the intake air amount; an intake air temperature sensor 109 that detects an intake air temperature; an $O_2$ sensor 110 that detects an oxygen concentration in the exhaust gas Ex; and a fuel pressure sensor 111 that detects a pressure of the fuel (fuel pressure) in the delivery pipe 10d on the high-pressure side.

—EG-ECU—

The operation state of the engine 1 configured as described above is controlled by the EG-ECU 100 under the cooperation with the PMC 200. In this embodiment, each of the EG-ECU 100, the PMC 200 and the MG-ECU 8 includes a CPU (central processing unit), a ROM (program memory), a RAM (data memory), a backup RAM (non-volatile memory) and the like, which is a known configuration.

The ROM stores various control programs and maps to be referred to when executing the various control programs. The CPU executes calculation processing based on the various control programs and the maps stored in the ROM. The RAM is a memory for temporary storing calculation results by the CPU and data input from the respective sensors. The backup RAM is a nonvolatile memory for storing data to be stored when the engine 1 is stopped. The ROM, the CPU, the RAM and the backup RAM are connected to each other via a bus.

The EG-ECU 100 and the PMC 200 are connected in such a manner that they can transmit and receive between each other information necessary for the engine control and the motor generator control. The MG-ECU 8 is also connected to the PMC 200 in such a manner that they can transmit and receive between each other information necessary for the motor generator control. Furthermore, a monitoring unit (not shown) of the HV battery 7 is connected to the PMC 200 in such a manner that they can transmit and receive between each other information necessary for managing the HV battery 7.

Figure 3:
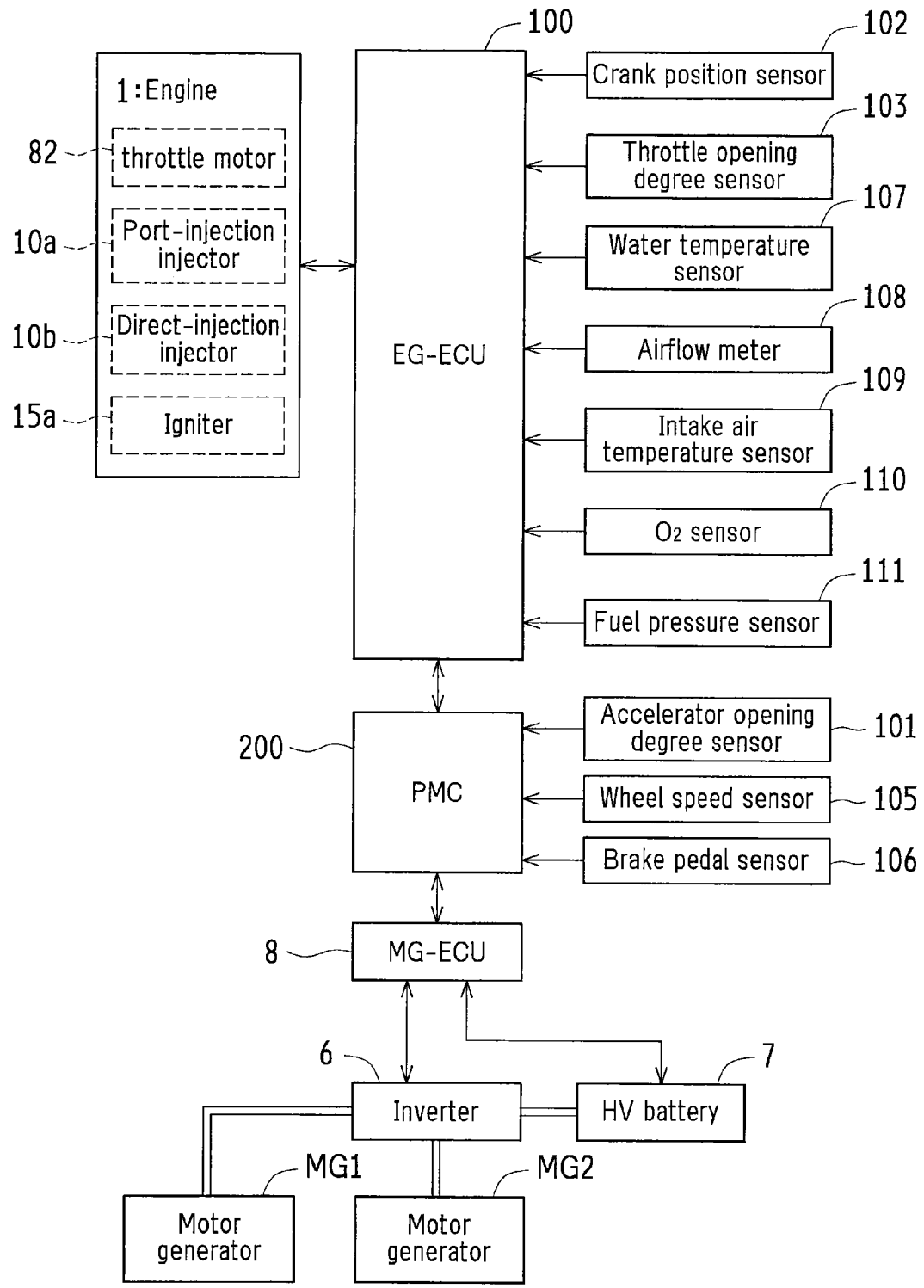
FIG. 3 is a block diagram of a control system of the hybrid system.

As shown in FIG. 3, as one example, to an input interface of the EG-ECU 100 are connected at least the crank position sensor 102, the throttle opening degree sensor 103, the water temperature sensor 107, the airflow meter 108, the intake air temperature sensor 109, the $O_2$ sensor 110 and the fuel pressure sensor 111. On the other hand, to an output interface of the EG-ECU 100 are connected the throttle motor 82, the port-injection injector 10a, the direct-injection injector 10b, an igniter 15a of the spark plug 15 and the like.

As shown in FIG. 1, to an input interface of the PMC 200 are connected at least the accelerator opening degree sensor 101, a wheel speed sensor 105, a brake pedal sensor 106 and the like. The PMC 200 detects: the accelerator opening degree based on output of the accelerator opening degree sensor 101; and a brake pedal stepping operation (not shown) based on output of the brake pedal sensor 106. The PMC 200 calculates, based on output of the wheel speed sensor 105: the respective rotational speeds of the front wheels 2 and the rear wheels; and the vehicle speed.

Also, the PMC 200 obtains, from the monitoring unit of the HV battery 7, information such as an integrated value of a charge/discharge current, and a battery temperature so as to calculate the state of charge (SOC) and the like of the HV battery 7. Furthermore, the PMC 200 allocates the driving force required of the vehicle to the engine 1 and the motor generator MG 2 so as to calculate the target engine output and the target motor torque, which are output respectively as the control instructions.

The EG-ECU 100 performs various types of control of the engine 1 including, for example: drive control (fuel injection control) of the port-injection injector 10a and the direct-injection injector 10b; control of the ignition timing of the spark plug 15; and drive control of the throttle motor 82 (throttle opening degree control), based on signals input from the above-described sensors and switches, and the control instruction from the PMC 200 (target engine output).

As one example, the EG-ECU 100 calculates a target throttle opening degree based on the engine rotational speed calculated by the output signal of the crank position sensor 102 and the information on the target engine output from the PMC 200, and outputs a control signal to the throttle motor 82. In this way, the throttle opening degree is controlled so that the cylinder 11 is filled with a required amount of the air-fuel mixture (i.e., so as to obtain a required load ratio).

Also, the EG-ECU 100 controls an operation timing and an operation time period of the port-injection injector 10a and the direct-injection injector 10b. In this embodiment, since two injectors 10a and 10b are provided, it is possible to realize the fuel injection state by any one of the port-injection mode, the cylinder-injection mode and the double-injection mode.

Figure 4:
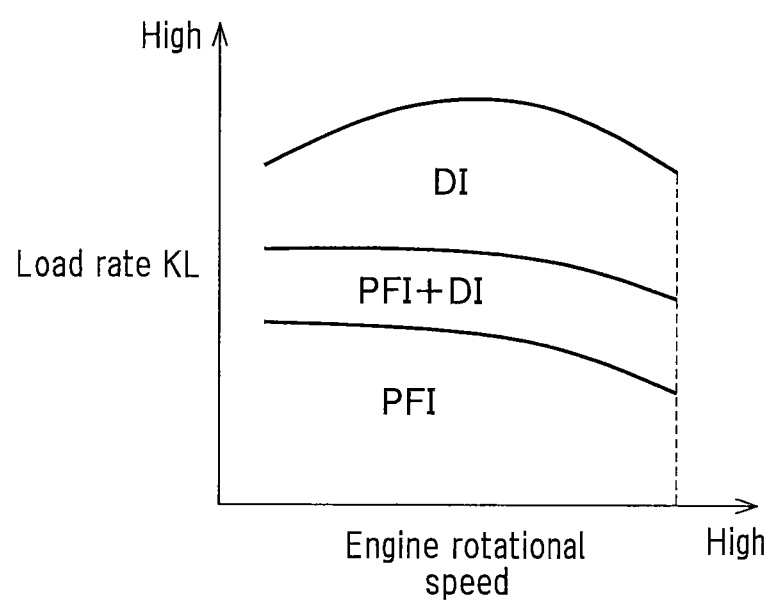
FIG. 4 is an explanatory diagram showing one example of a control map for switching between modes of a dual injection.

In FIG. 4, each operation region of the corresponding mode is exemplarily shown. The port-injection mode is used in the operation region on the side of the low load (PFI) where the driving force required of the engine 1 is relatively small, and the fuel is injected by the port-injection injector 10a so as to be mixed with the intake air mainly inside the intake port 14a. In this way, it is possible to reduce a loss of the driving force that is caused by the operation of the high-pressure fuel pump 10e, and there occurs no problem of noise and vibration generated by the direct-injection injector 10b.

On the other hand, the cylinder-injection mode is used in the operation region (DI) on the side of the high load, where the driving force required of the engine 1 is relatively large, and the fuel is injected by direct-injection injector 10b mainly in the intake stroke while the air is drawn to the combustion chamber 12, as described above, so that the fuel is mixed with the air mainly inside the combustion chamber 12. In this way, the intake air can be effectively cooled by a latent heat of the fuel injected inside the combustion chamber 12. Thus, a charging efficiency can be improved, which is advantageous for a high output.

Furthermore, the double-injection mode is used in the operation region (PFI+DI) that intermediates between the above regions, and the fuel injected by the port-injection injector 10a is mixed with the intake air inside the intake port 14a as described above while the fuel is further injected by the direct-injection injector 10b in the intake stroke and the compression stroke of the cylinder 11. The injection mode is switched among the above injection modes based on, for example, the operation state of the engine 1 and the driving force required of the engine 1 in the hybrid system, i.e., the target engine output.

—Deposit Removing Control—

As described above, in the engine 1 of this embodiment, the port-injection mode is used in the operation region on the side of the low load (PFI), where the fuel is injected by only the port-injection injector 10a. When the above operation state continues for a while, deposit is formed and accumulates on the injection hole of the direct-injection injector 10b that faces the combustion chamber 12 in a cylinder 11 and that is exposed to a combustion gas having a high temperature.

For this matter, in the present invention, when the deposit greater than or equal to a predetermined amount accumulates on the direct-injection injector 10b, the fuel is injected forcibly by the direct-injection injector 10b so as to perform deposit removing control to remove the deposit that accumulates on the injection hole, even if the operation state is in the operation region on the side of the low load (PFI) where only the port-injection injector 10a is supposed to be used.

However, as described above, if the injection of the fuel only by the port-injection injector 10a continues, the fuel in the delivery pipe 10d that is on the high-pressure side and that is connected to the direct-injection injector 10b is further pressurized by receiving heat from the engine 1. For this reason, even if the direct-injection injector 10b is opened and closed for its minimum operation time period, the amount of the injected fuel exceeds the target injection amount, which may cause deterioration of combustion and emission due to a temporary enrichment of an air-fuel ratio.

In consideration of the above problem, in this embodiment, it is determined whether execution of the deposit removing control is permitted based on the fuel pressure of the delivery pipe 10d and the current load rate KL of the engine 1. That is, as the fuel pressure to the direct-injection injector 10b becomes higher, the minimum injection amount more increases, however, if the load rate KL of the engine 1 is high, a required injection amount increases. And when such a required injection amount is greater than or equal to the minimum injection amount, the above enrichment of the air-fuel ratio does not occur.

Hereinafter, a description will be given on the procedure of the deposit removing control performed by the EG-ECU 100 during operation of the engine 1 using the flowchart indicated by FIG. 5. Such a routine of the deposit removing control is repeatedly performed at a predetermined interval when, for example, the engine 1 is operated in the port-injection mode.

In the step ST 101 after starting, the CPU of the EG-ECU 100 reads, from the RAM, the current engine rotational speed, the load rate KL, the fuel pressure Pr of the delivery pipe 10d and the like. The engine rotational speed is calculated based on the signal from the crank position sensor 102, and the load rate KL is calculated based on the engine rotational speed and the intake air amount calculated based on the signal from the airflow meter 108, so that such calculated engine rotational speed and the load rate KL are temporarily stored in the RAM.

Subsequently, in step ST 102, a switching permission load rate $KL_0$, which is the threshold value to determinate whether the deposit removing control is permitted, is read from a table stored in the RAM. As described later, the switching permission load rate $KL_0$ is the threshold value of the load rate KL to determine whether switching to the operation of the direct-injection injector 10b is permitted for the deposit removing control when it is determined that the deposit accumulation amount on the direct-injection injector 10b is greater than or equal to the predetermined amount.

Figure 6:
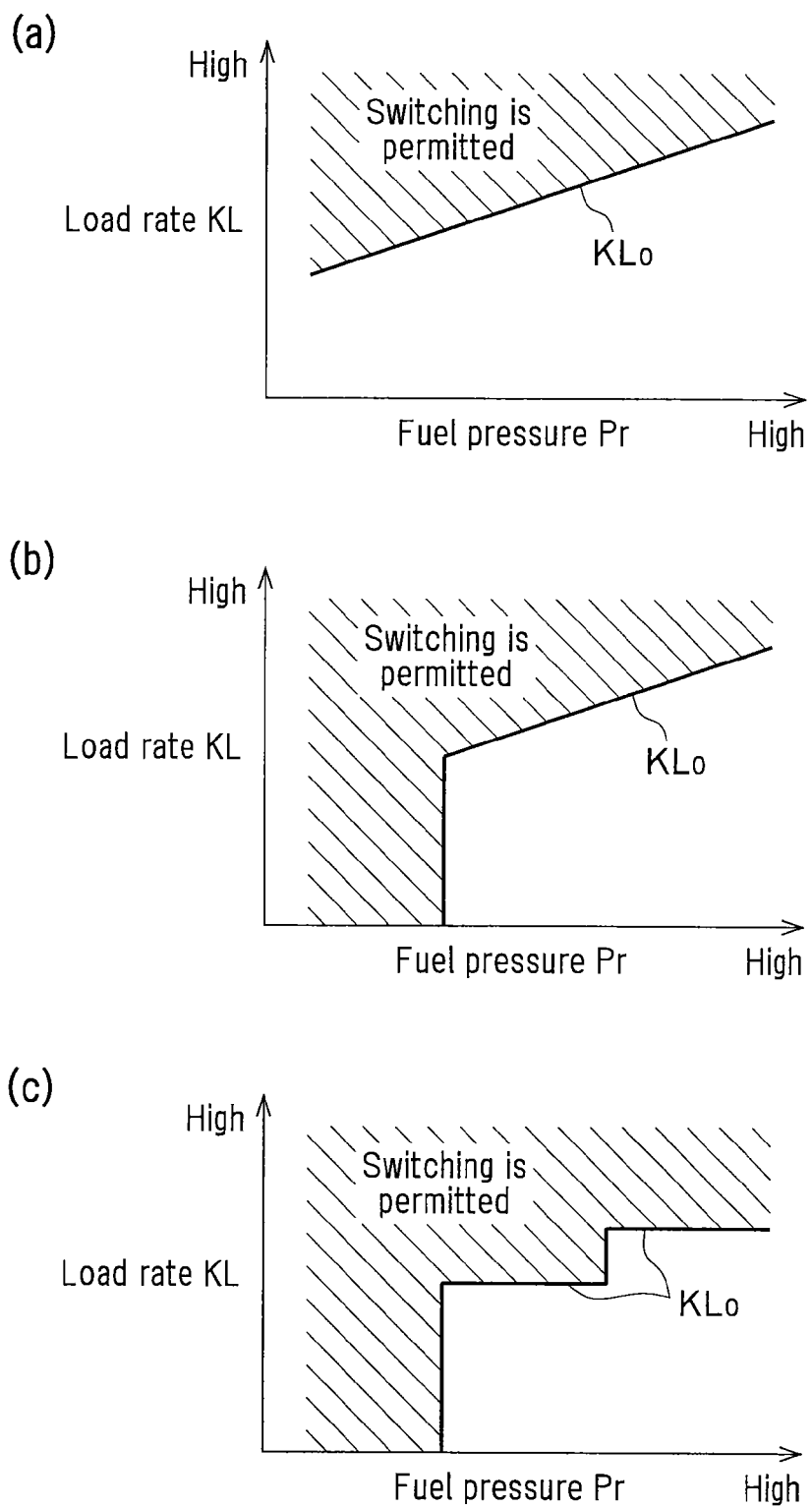
FIG. 6 are explanatory diagrams showing examples of a table for setting a load rate that permits the deposit removing control based on a fuel pressure.

As one example, in the table shown in FIG. 6(a), as the fuel pressure Pr of the delivery pipe 10d becomes higher, the switching permission load rate $KL_0$ becomes higher. That is, the relationship between the fuel pressure Pr of the delivery pipe 10d and the switching permission load rate $KL_0$ is set so as to draw a diagonal line from bottom left to top right. The load rate KL is adapted by experiments, calculations and the like so that the minimum injection amount is the required injection amount, in consideration of the fact that the minimum injection amount, which corresponds to the minimum valve opening time period of the direct-injection injector 10b, more increases as the fuel pressure Pr becomes higher.

Thus, in the upper side region of the figure (relatively high-load region), which includes the straight line of the switching permission load rate $KL_0$, the amount of fuel that is injected according to the load rate KL of the engine 1 is greater than or equal to the minimum injection amount of the direct-injection injector 10b, which preventing an unexpected enrichment of the air-fuel ratio. In other words, the switching to the operation of the direct-injection injector 10b for the deposit removing control is permitted in the above region.

The table shown in FIG. 6(a) is merely one example. As shown in FIG. 6(b), when the fuel pressure Pr is less than a predetermined value, the switching permission load rate $KL_0$ may be zero so as to permit the execution of the deposit removing control regardless of whether the load rate KL is high or low. Also, as shown, for example, in FIG. 6(c), the switching permission load rate $KL_0$ may become high in a stepwise manner instead of the switching permission load rate $KL_0$ gradually increasing according to the rise of the fuel pressure Pr. Furthermore, the switching permission load rate $KL_0$ may be substantially a constant value, although it is not shown in the figure.

In step ST 103, the deposit accumulation amount on the direct-injection injector 10b is estimated so as to determine whether the estimated value is greater than or equal to a predetermined criterion value. The deposit accumulates when the port-injection mode continues and the injection hole of the direct-injection injector 10b is exposed to the combustion gas having the high temperature. When the fuel is injected by the direct-injection injector 10b in the cylinder-injection mode, the deposit is blown off and removed by such an injection. Thus, the deposit accumulation amount is obtained, for example, by addition according to accumulation of the time period for the port-injection mode and by subtraction according to accumulation of the time period for the cylinder-injection mode, thereby the deposit accumulation amount is estimated.

In this way, it is possible to determine that the deposit accumulation amount on the direct-injection injector 10b is greater than or equal to the predetermined criterion value when, within a predetermined time period up to the present time, the accumulated time period for the port-injection mode (accumulated time period for the fuel injection by the port-injection injector 10a) is greater than or equal to a first predetermined value (e.g. several hours), and furthermore, the accumulated time period for the cylinder-injection mode (accumulated time period for the fuel injection by the direct-injection injector 10b) is less than or equal to a second predetermined value (e.g. several minutes) that is less than the first predetermined value.

The deposit accumulation amount of the direct-injection injector 10b more increases as a temperature inside the combustion chamber 12 is higher, and more decreases as the temperature is lower. Also, a removed deposit amount by the operation of the direct-injection injector 10b more increases as the injection amount more increases and the injection pressure more increases. Accordingly, the deposit accumulation amount may be estimated in further consideration of an operation history of the engine 1 within the above predetermined time period. The deposit accumulation amount can also be estimated from a blocked state of the injection hole based on deviation from a learning value of the fuel injection control by the direct-injection injector 10b.

If the determination result is negative (NO), the procedure advances to step ST 107 described later. On the other hand, if the determination result is affirmative (YES), the procedure advances to step ST 104 where it is determined whether the HV battery 7 should be charged. Such a determination can be performed based on information received from the PMC 200. For example, it is determined whether the motor generator MG 1 should operate as the generator to address decrease of the SOC of the HV battery 7 (or, the determination may also be performed so as to supply generated electric power for drive to the motor generator MG 2).

If the determination result of the charge requirement is negative (NO), the procedure advances to step ST 107 described later. On the other hand, if the determination result is affirmative (YES), the procedure advances to step ST 105 where it is determined whether the current load rate KL of the engine 1 is greater than or equal to the switching permission load rate $KL_0$ calculated in the above-described step ST 102 ($KL \geq KL_0$ ?). If the determination result is affirmative (YES), the procedure advances to step ST 106 where a deposit removing control execution flag is turned to "ON" (flag ON).

That is, if the load rate KL of the engine 1 is greater than or equal to the switching permission load rate $KL_0$ when it is determined that the deposit accumulation amount on the direct-injection injector 10b is greater than or equal to the criterion value, the execution of the deposit removing control is permitted. Thus, the deposit removing control is performed according to the electric power generating operation of the motor generator MG 2 responding to the charge requirement. Specifically, even in the port-injection mode, the fuel is injected by the direct-injection injector 10b so as to remove the deposit.

In this case, the load rate KL is greater than or equal to the switching permission load rate $KL_0$, and the target injection amount is relatively large. Thus, even if the fuel pressure Pr is high, the actual fuel injection amount from the direct-injection injector 10b does not exceed the target injection amount, which preventing the deterioration of the combustion state and the emission by the enrichment of the air-fuel ratio. Also, if a small torque fluctuation occurs because the actual fuel injection amount varies and becomes slightly greater than the target injection amount, such a torque fluctuation blends into a torque change accompanied by the electric power generating operation of the motor generator MG 2. Thus, it hardly causes an uncomfortable feeling to an occupant of the vehicle.

On the other hand, if the current load rate KL is less than the switching permission load rate $KL_0$ ($KL < KL_0$) in the above-described step ST 105, i.e., if the determination result is negative (NO), the procedure advances to step ST 107 where the deposit removing control execution flag is turned to "OFF" (flag OFF). That is, if the fuel pressure Pr is high when the load rate KL is less than the switching permission load rate $KL_0$, the actual fuel injection amount from the direct-injection injector 10b exceeds the target injection amount, which may cause the deterioration of the combustion and the emission due to the enrichment of the air-fuel ratio. Then, the deposit removing control is prohibited.

In this embodiment, when the charge is not required (when the determination result is negative (NO) in the above-described step ST 104), the deposit removing control execution flag is turned to "OFF" (in step ST 107), thus the procedure returns. Naturally, if the estimated deposit amount on the direct-injection injector 10b does not reach the criterion value and the determination result is negative (NO) in the above-described step ST 103, the deposit removing control execution flag is turned to "OFF" (in step ST 107), thus the procedure returns.

Therefore, in the engine 1 of this embodiment, if the deposit greater than or equal to the predetermined amount accumulates on the injection hole of the direct-injection injector 10*b*, the execution of the deposit removing control is permitted conditional on the load rate KL of the engine 1 being greater than or equal to the switching permission load rate $KL_0$, while the execution of the deposit removing control is prohibited conditional on the load rate KL of the engine 1 being less than the switching permission load rate $KL_0$. Thus, the opportunity to perform the deposit removing control can be increased to the extent possible while preventing the deterioration of the combustion and the emission caused by the control.

Specifically, the switching permission load rate $KL_0$ is set according to the pressure of the fuel supplied to the direct-injection injector 10*b* so that the switching permission load rate $KL_0$ becomes higher as the fuel pressure becomes higher. Thus, when the fuel pressure is not so high and the minimum injection amount of the direct-injection injector 10*b* is relatively small (i.e., close to the standard minimum injection amount), the execution of the deposit removing control is permitted to the extent of the lower-load state, thus, the opportunity to perform the control increases.

On the other hand, the minimum injection amount of the direct-injection injector 10*b* more increases as the fuel pressure more increases (i.e., deviation from the standard minimum injection amount becomes larger). As a result, the switching permission load rate $KL_0$ also becomes higher. Thus, the execution of the deposit removing control is not permitted unless the load rate KL becomes higher. That is, the deposit removing control is not permitted unless the target injection amount, which increases according to the rise of the load, becomes greater than or equal to the minimum injection amount. Thus, it is possible to reliably suppress the enrichment of the air-fuel ratio.

In brief, in this embodiment, it is possible to realize, in the higher dimension, the two objects that contradict to each other: to increase the opportunity to perform the deposit removing control to the extent possible; and to prevent the deterioration of the combustion and the emission caused by the control.

Furthermore, in this embodiment, the deposit removing control is performed when the motor generator MG 2 operates as the electric power generator responding to the charge requirement. Thus, if a small torque fluctuation occurs because of a variation of the fuel injection amount from the direct-injection injector 10*b*, it hardly causes an uncomfortable feeling to the occupant of the vehicle.

As described above, in the hybrid vehicle of this embodiment, even when the ignition switch is on during travel, the engine 1 is occasionally stopped and re-started repeatedly, i.e., performs the intermittent operation, although the description in detail is omitted here. Thus, the deposit removing control may be performed at the time of re-starting that is intermittently performed.

—Variation 1—

Figure 7:
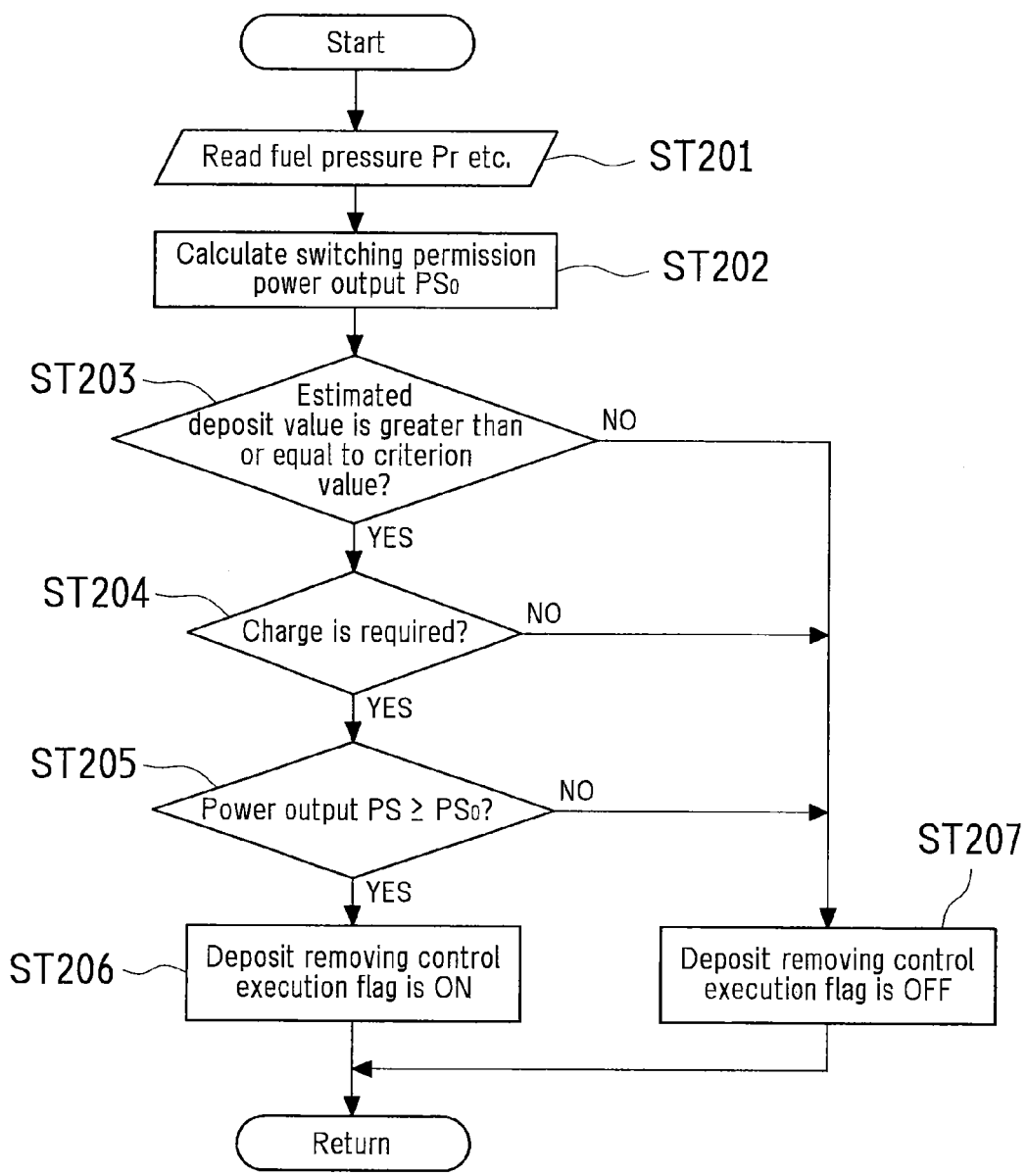
FIG. 7 is a flowchart corresponding to FIG. 5 according to variation 1 so as to determine whether the deposit removing control is permitted or not based on an engine power output.

FIG. 7 indicates a routine of the deposit removing control according to a variation of the above-described embodiment. In variation 1, it is determined whether the execution of the deposit removing control is permitted in consideration of not the load rate KL of the engine 1, but the engine power output (horsepower), i.e., both of the load and the rotational speed of the engine 1.

Figure 5:
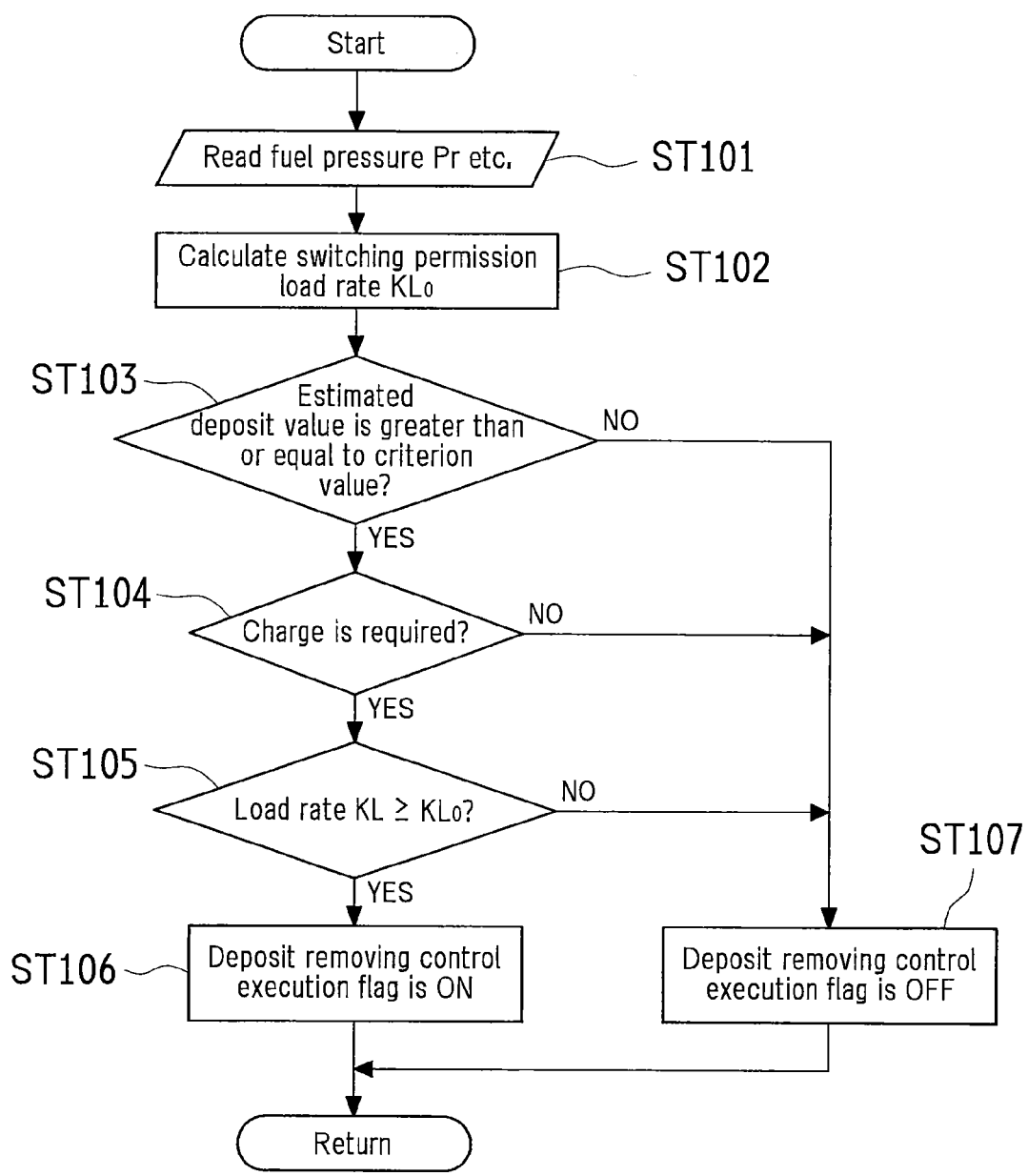
FIG. 5 is a flowchart showing a procedure of deposit removing control.

In particular, in steps ST 201 to ST 207 indicated in the flowchart of FIG. 7, the control procedure is performed similarly to steps ST 101 to ST 107 in the flowchart of FIG. 5 as a whole. However, in step ST 202, a switching permission power output $PS_0$ is calculated instead of the switching permission load rate $KL_0$. Specifically, similarly to the above-described embodiment, it is sufficient to read the switching permission power output $PS_0$, according to the fuel pressure Pr, from a table stored in the RAM. In the table, the switching permission power output $PS_0$ is set to be higher value as the fuel pressure Pr becomes higher.

In steps ST 203 and ST 204, it is determined whether the deposit accumulation amount increases and whether the charge is required, similarly to the procedure in steps ST 103 and ST 104 in the flowchart of FIG. 5. Then, in step ST 205, the switching permission power output $PS_0$ read in the above-described step ST 202 is compared with a target engine power output PS that is a control instruction from the PMC 200 so as to determine whether the execution of the deposit removing control is permitted.

Consequently, if the target engine power output PS is greater than or equal to the switching permission power output $PS_0$ ($PS \geq PS_0$) and the determination result is affirmative (YES), the procedure advances to step ST 206 where the deposit removing control execution flag is turned to "ON" (flag ON). On the other hand, if the target engine power output PS is less than the switching permission power output $PS_0$ ($PS < PS_0$) and the determination result is negative (NO), the procedure advances to step ST 207 where the deposit removing control execution flag is turned to "OFF" (flag OFF).

In this way, in variation 1, since it is determined whether the execution of the deposit removing control is permitted based on the power output (horsepower) of the engine 1, it is possible to determine more appropriately in consideration of not only the load level of the engine 1 but also affection by the engine rotational speed. In other words, similarly to the above-described embodiment, basically the deposit removing control is more easily permitted as the engine load becomes higher, but in addition to the above, the deposit removing control is also more easily permitted as the engine rotational speed becomes higher.

Therefore, it is possible to further increase the opportunity to perform the deposit removing control compared to the above-described embodiment. As a result of which the deposit removing control is more easily permitted as the engine rotational speed becomes higher, it is more probable that the air-fuel ratio is enriched at the same time. However, as the engine rotational speed is higher, it becomes more difficult for an occupant of the vehicle to note the torque fluctuation. Thus, if a small torque fluctuation occurs because of the slight enrichment of the air-fuel ratio, it hardly causes an uncomfortable feeling to the occupant of the vehicle.

—Variation 2—

Figure 8:
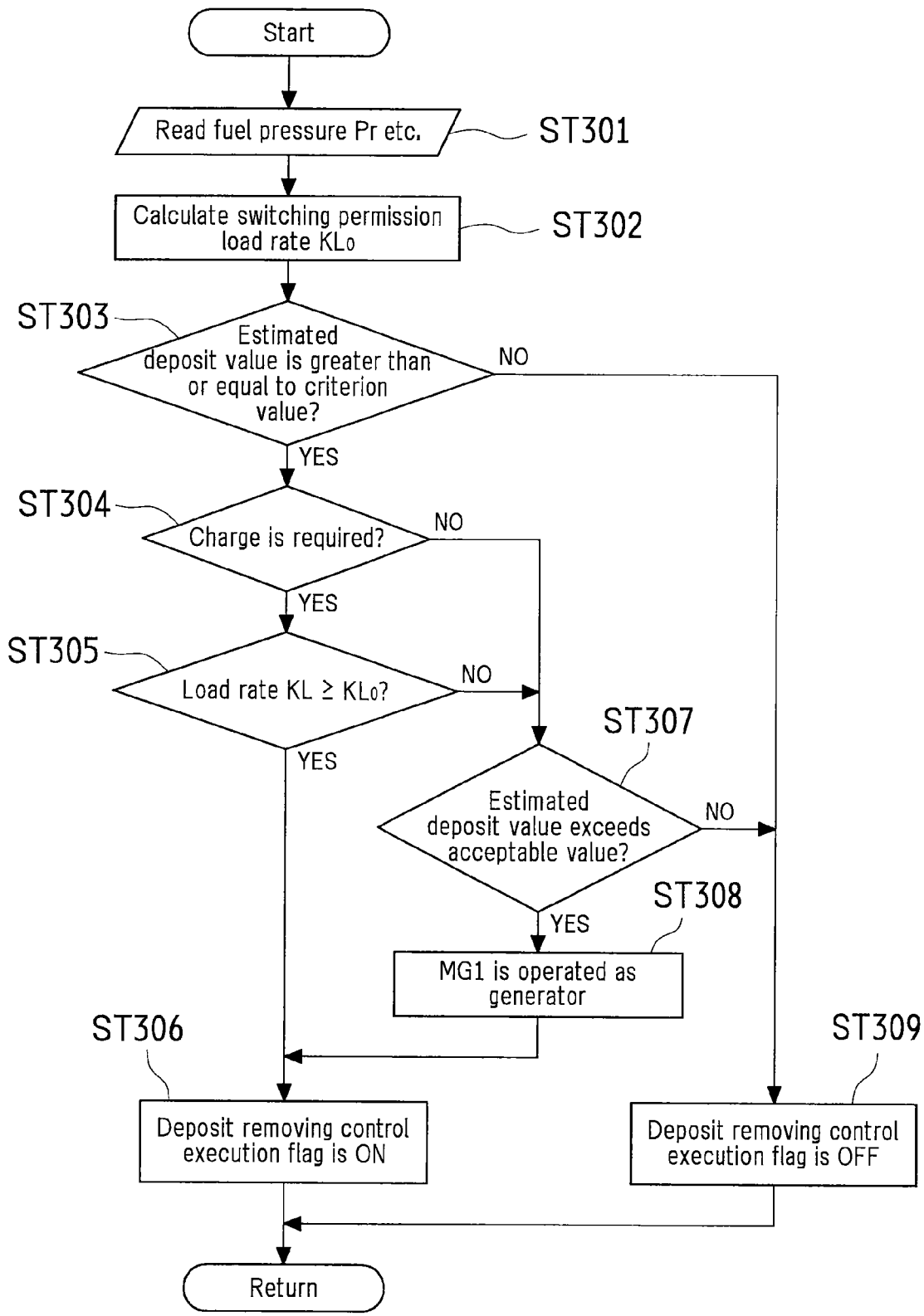
FIG. 8 is a flowchart corresponding to FIG. 5 according to variation 2 so as to forcibly operate a motor generator to generate electric power in order to perform the deposit removing control.

Next, FIG. 8 indicates a routine of the deposit removing control according to variation 2. In variation 2, if the deposit accumulation amount on the direct-injection injector 10*b* considerably increases and removing the deposit has priority, the motor generator MG 1 of the hybrid vehicle is forcibly operated to make the opportunity to perform the deposit removing control.

Specifically, the same control as steps ST 101 to ST 106 in the flowchart of FIG. 5 is performed in steps ST 301 to ST 306 in the flow chart of FIG. 8. However, if the procedure advances to step ST 307 when it is determined that the charge is not required (NO) in step ST 304 or when it is determined that the load rate KL is represented by the inequality $KL<KL_0$ in step ST 305, it is determined whether the estimated value of the deposit accumulation amount on the direct-injection injector 10*b* exceeds an acceptable value.

As to the acceptable value used to the determination, it may be set to a value greater than the criterion value to determine whether the deposit accumulation amount is large in step ST 203. If the determination result is negative (NO) in step ST 307, the procedure advances to step ST 309 where the deposit removing control execution flag is turned to "OFF", similarly to step ST 107 in the flowchart of FIG. 5. On the other hand, if the deposit accumulation amount exceeds the acceptable value and the determination result is affirmative (YES), the procedure advances to step ST 308 where the motor generator MG 1 is forcibly operated as the electric power generator.

Due to the electric power generating operation of the motor generator MG 1, the load of the engine 1 increases, accordingly the target injection amount of the fuel increases. Thus, if the fuel pressure of the delivery pipe 10*d* is high when the fuel injection is switched to that by the direct-injection injector 10*b*, the air-fuel ratio is hardly enriched. Also, even if a small torque fluctuation occurs because of a slight enrichment of the air-fuel ratio, such a torque fluctuation blends into a torque change accompanied by the electric power generating operation of the motor generator MG 2. Thus, it hardly causes an uncomfortable feeling to an occupant of the vehicle.

Then, the procedure advances to step ST 306 where the deposit removing control execution flag is turned to "ON". That is, if it is determined that the deposit accumulation amount is exceeding the acceptable scope and that it should be removed quickly, it is possible to increase the opportunity to perform the deposit removing control by increasing the engine load using the motor generator MG 1 of the hybrid vehicle.

—Other Embodiments—

The present invention is not limited to the above-described embodiment and its variations, and includes various other aspects. For example, in the above-described embodiment and variations, the description is given on the case where the fuel injection device according to the present invention is applied to the engine 1 of a series parallel hybrid vehicle. However, the present invention is not limited thereto. The present invention is applicable to the engine 1 of other hybrid systems, or also applicable, as a fuel injection device, to an engine of a vehicle having a system other than the hybrid system.

Figure 9:
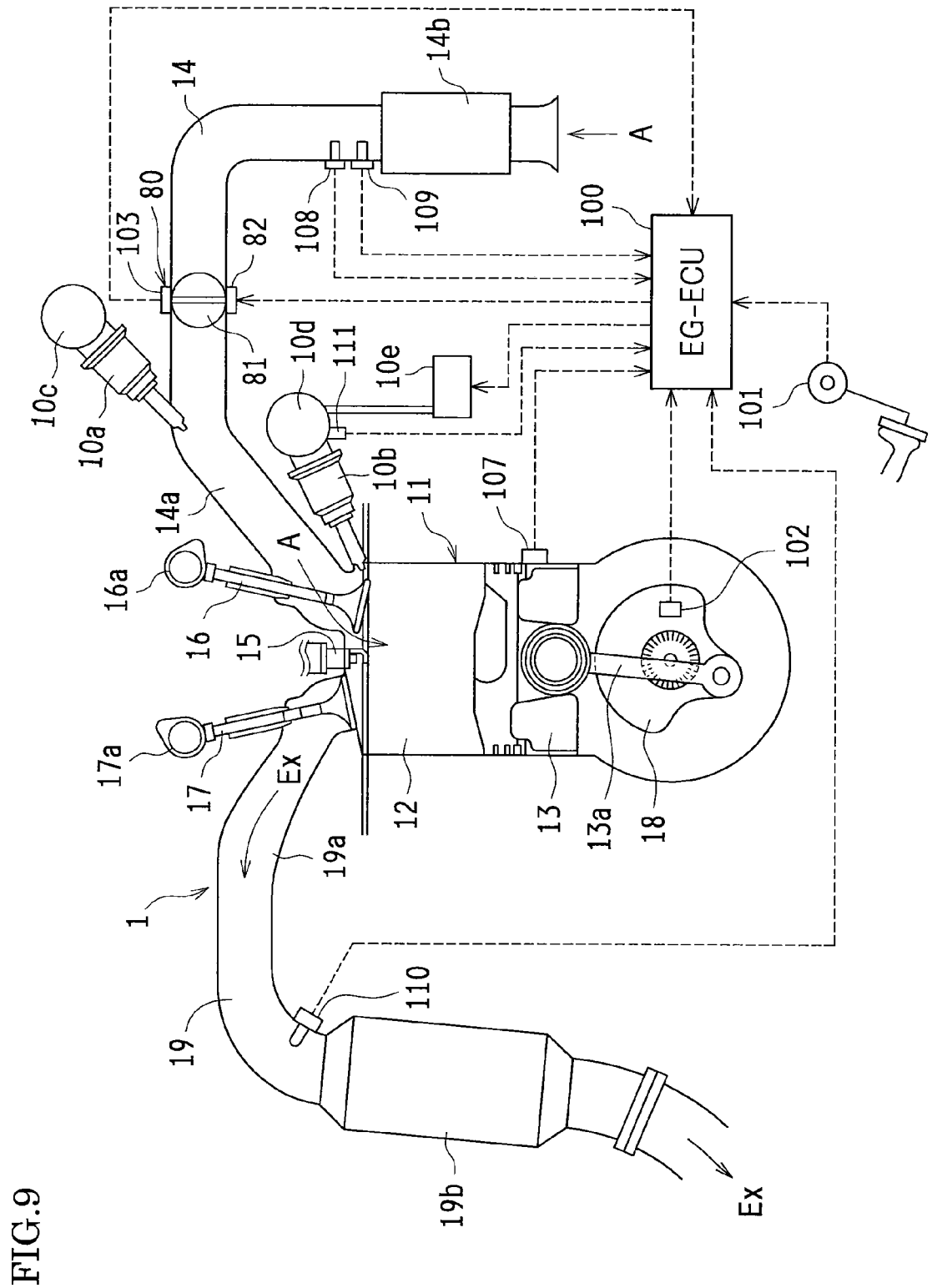
FIG. 9 is a diagram corresponding to FIG. 2 according to another embodiment in which the present invention is applied to a vehicle other than the hybrid vehicle.
Figure 10:
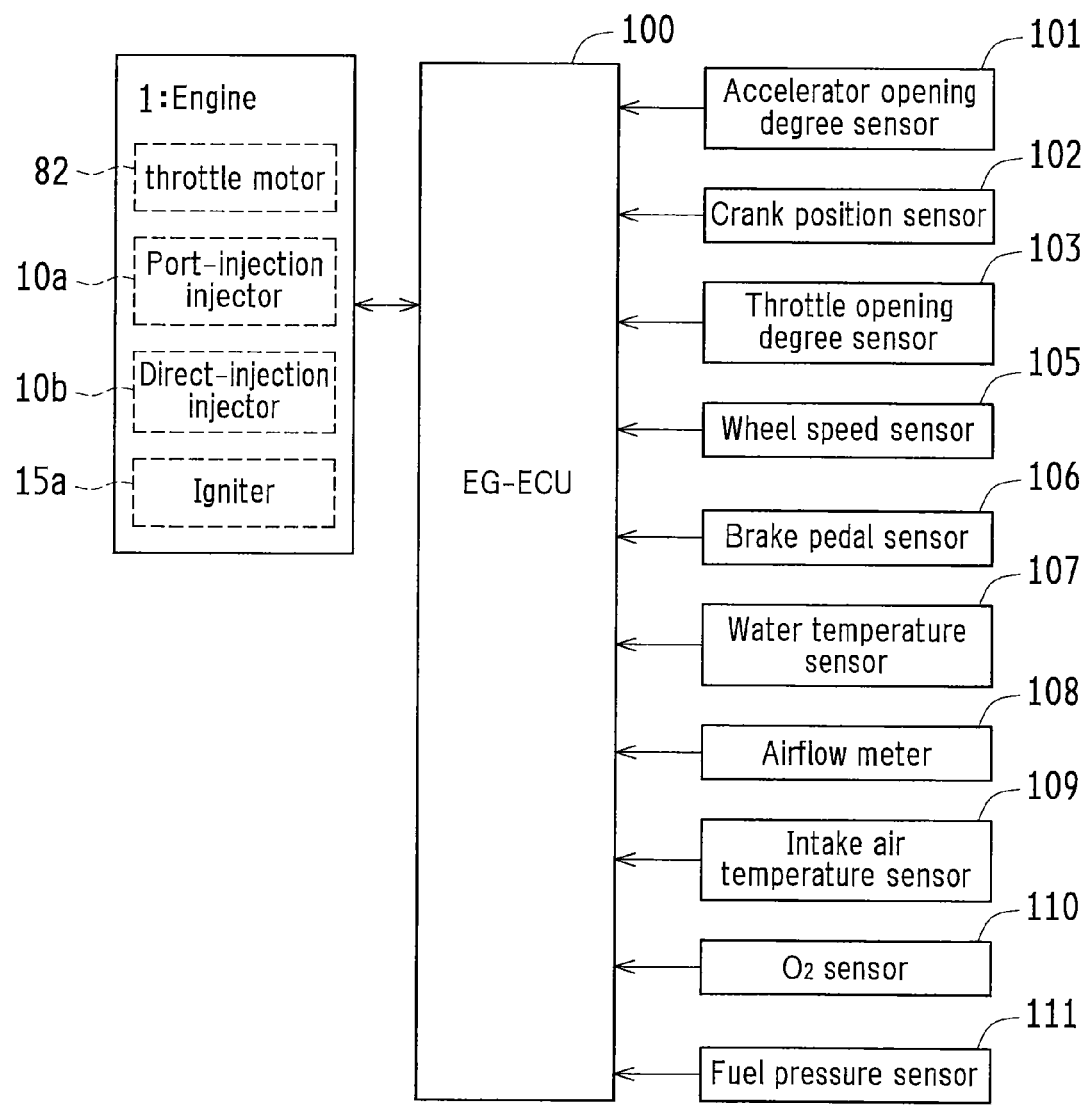
FIG. 10 is a block diagram corresponding to FIG. 3 according to the embodiment of FIG. 9.

One example other than the hybrid system is shown in FIGS. 9 and 10. The configuration of the engine 1 may be the same as that shown in FIGS. 2 and 3. In this case, since the PMC 200 and the MG-ECU 8 do not exist, the accelerator opening degree sensor 101, the wheel speed sensor 105, the brake pedal sensor 106 and the like are connected to the EG-ECU 100.

Figure 11:
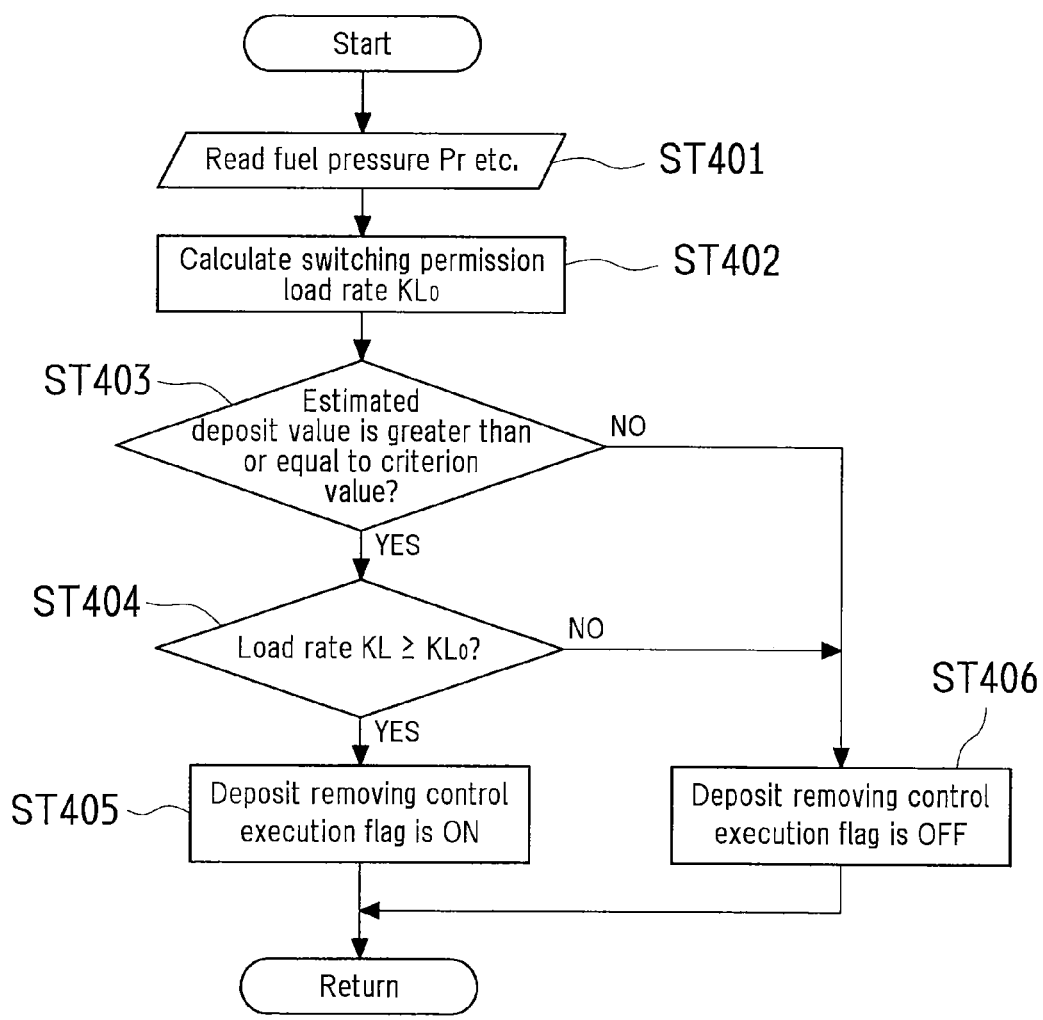
FIG. 11 is a flowchart corresponding to FIG. 5 according to the embodiment of FIG. 9.

In the deposit removing control, as shown in the flowchart of FIG. 11, the same procedure as shown in steps ST 101 to ST 103 and ST 105 to ST 107 in the flowchart of FIG. 5 is performed in steps ST 401 to 206. Specifically, it is not determined whether the charge is required as it is determined in step ST 104 in the flowchart of FIG. 5. The deposit removing control is performed if the load rate KL of the engine 1 is greater than or equal to the switching permission load rate $KL_0$ when it is determined that the deposit accumulation amount on the direct-injection injector 10*b* is greater than or equal to the criterion value.

In this way, it is possible for the engine 1 of a vehicle having the system other than the hybrid system to obtain a function and effect similar to the above-described embodiment 1. Also, in the engine 1 mounted on the hybrid vehicle, it is possible to omit, as shown in the flowchart of FIG. 11, the determination whether the charge is required.

The foregoing embodiments disclosed herein are to be considered in all respects as illustrative and not limiting. The scope of the invention is indicated by the appended claims rather than by the foregoing description, and all modifications and changes that come within the meaning and range of equivalency of the claims are intended to be embraced therein.

INDUSTRIAL APPLICABILITY

In the present invention, in a dual injection type internal combustion engine, it is possible to increase an opportunity to perform control to remove deposit accumulated on an injection hole of a cylinder injection valve to the extent possible while preventing deterioration of combustion and emission caused by the control. Thus, it is suitable for an internal combustion engine mounted on a vehicle.

DESCRIPTION OF REFERENCE NUMERALS

1 Engine (internal combustion engine)
10*a* Port-injection injector (intake passage injection valve)
10*b* Direct-injection injector (cylinder injection valve)
11 Cylinder
14 Intake passage
14*a* Intake port
100 EG-ECU (engine control computer; control device)
200 PMC (power management control computer; control device)
MG1 Motor generator (power generator)

The invention claimed is:

1. A fuel injection device of an internal combustion engine, comprising:
    a cylinder injection valve configured to inject fuel inside a cylinder of the internal combustion engine;
    an intake passage injection valve configured to inject fuel inside an intake passage; and
    a control device configured to perform deposit removing control to inject the fuel by the cylinder injection valve so as to remove deposit on the cylinder injection valve when the deposit greater than or equal to a predetermined amount accumulates,
    wherein, when a pressure of the fuel supplied to the cylinder injection valve is greater than or equal to a predetermined value, the control device permits execution of the deposit removing control in a region where an engine load is high, and does not permit the execution of the deposit removing control in a region where the engine load is low.

2. The fuel injection device of the internal combustion engine according to claim 1,
    wherein the control device permits the execution of the deposit removing control when an engine load rate is greater than or equal to a predetermined threshold value, and does not permit the deposit removing control when the engine load rate is less than the threshold value, and
    wherein the threshold value of the engine load rate is set to be higher as the fuel pressure is higher.

3. The fuel injection device of the internal combustion engine according to claim 1,
    wherein, when the fuel pressure is less than the predetermined value, the control device permits the execution of the deposit removing control regardless of whether the engine load is high or low.

4. The fuel injection device of the internal combustion engine according to claim 1,
   wherein the control device permits the execution of the deposit removing control when an engine power output is greater than or equal to a predetermined threshold value, and does not permit the execution of the deposit removing control when the engine power output is less than the threshold value, and
   wherein the threshold value of the engine power output is set to be higher as the fuel pressure is higher.

5. The fuel injection device of the internal combustion engine according to claim 1,
   wherein the internal combustion engine is mounted on a vehicle,
   wherein the vehicle includes a generator driven by the internal combustion engine, and
   wherein the control device performs the deposit removing control when the generator operates to generate electric power.

6. The fuel injection device of the internal combustion engine according to claim 5,
   wherein the control device forcibly operates the generator to generate electric power in order to perform the deposit removing control.

7. The fuel injection device of the internal combustion engine according to claim 1,
   wherein the control device determines that the deposit greater than or equal to the predetermined amount accumulates on the cylinder injection valve when, within a predetermined time period up to a present time, an accumulated time period for the fuel injection by the intake passage injection valve is greater than or equal to a first predetermined value, and furthermore, an accumulated time period for the fuel injection by the cylinder injection valve is less than or equal to a second predetermined value that is less than the first predetermined value.

8. The fuel injection device of the internal combustion engine according to claim 7,
   wherein the control device determines that the deposit greater than or equal to the predetermined amount accumulates in further consideration of an operation history of the internal combustion engine within the predetermined time period.

* * * * *